Patented June 24, 1930

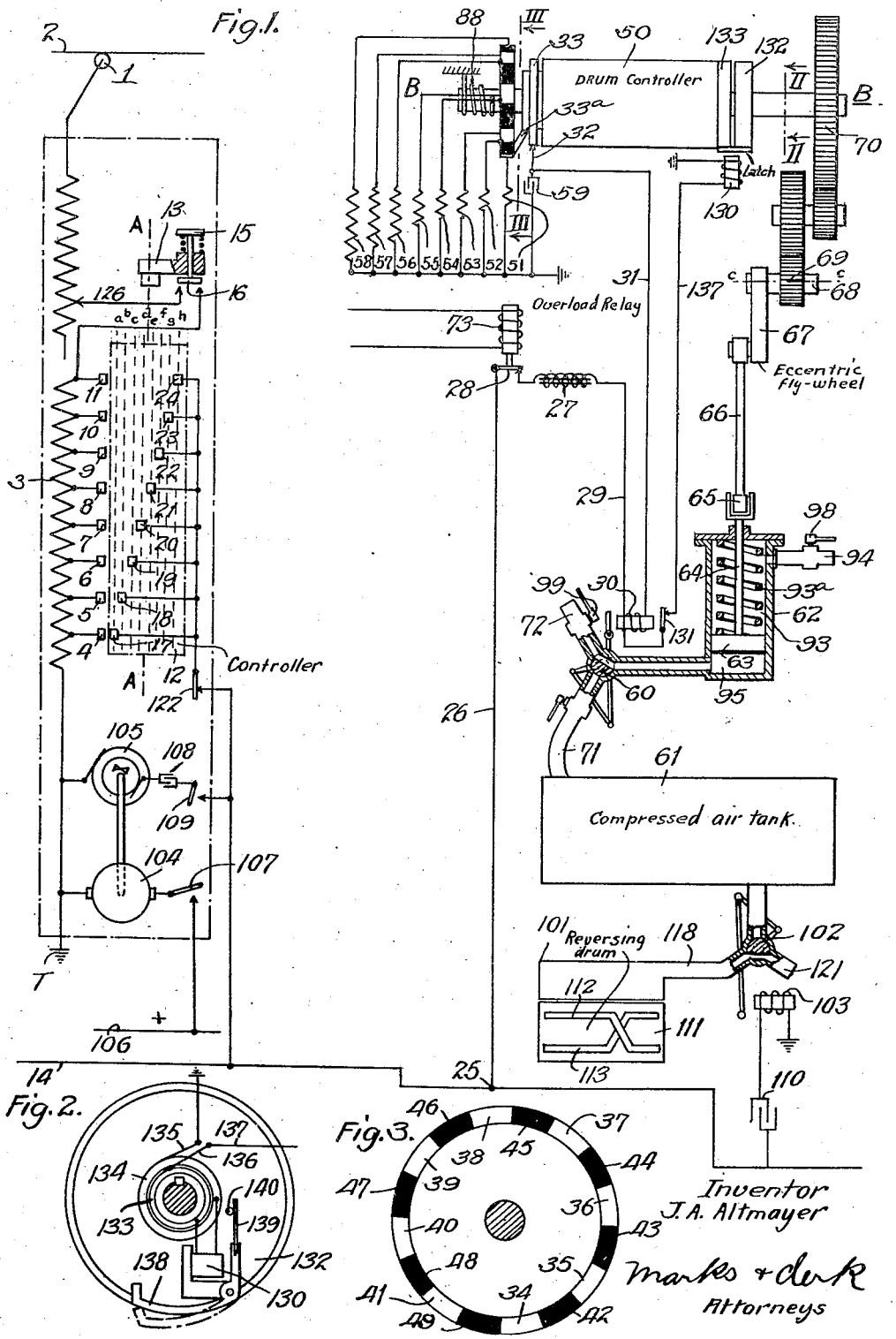

1,766,808

UNITED STATES PATENT OFFICE

JEAN ALTMAYER, SURNAMED ALTMAYER-DELARUELLE, OF ST.-GERMAIN-EN-LAYE, FRANCE

SYSTEM OF REMOTE CONTROL FOR ELECTRIC MOTORS

Application filed June 19, 1925, Serial No. 38,342, and in France July 3, 1924.

This invention consists in a device for the distant control of electric motors, in general, by means of only two control wires. This system is particularly applicable to the control of motors for electric railways, as herein specifically described. It is obvious, however, that the system is capable of other applications. In the special case of electric railways, but a single control wire is necessary, the rail being used as second wire for the return of the current. The system in accordance with this invention is considerably more simple than the systems actually in use in trains having multiple motor units. The latter requires the installation of a large number of wires throughout the length of the train.

The use of the present system is particularly convenient for the electric freight trains. In such cases it is not practical to employ multiple motor units owing to the considerable cost of equipment and to the relatively prolonged periods during which the rolling stock employed for the transport of freight are immobilized. Locomotives will therefore be preferred for such uses. The increase of the length of the train, by placing one or more locomotives at the head of the train is limited by the breaking of couplings. It will therefore be necessary to insert one or more locomotives in the length of the train. For reasons of security and economy of staff, these locomotives must be controlled by the motorman in the locomotive placed ahead. This result can be obtained with the system described hereinafter. This system has the additional advantage of simplicity since it requires the installation of only a single control wire on the cars and that it permits of strong and durable equipment on locomotives or on motor coaches.

The invention is characterized by a control switch, which can be operated by the motorman and is inserted in an electric circuit for producing modifications in the current passing through the circuit. These modifications of the current have the effect of producing the actuation of secondary switches, each corresponding respectively to the controller of each of the driving units; the secondary switches thus take a position corresponding to that of the control switch. Finally, the actuation of the secondary switches determine the corresponding actuation of the controllers so that the operation of the control switch permits the actuation of all the controllers by means of a single control circuit.

The modifications of the current are for instance variations in voltage, or interruptions of current (impulses). The movement of the secondary switches is obtained by a motor, the operation of which is controlled by a relay inserted in the control circuit. Finally, the secondary switches are preferably integral, with the controllers, or control only the rotation of the latter, which is produced by a source of energy different from that actuating the secondary switches.

The accompanying drawing illustrates, by way of example only, a specific embodiment of the invention.

Fig. 1 is a diagram of the entire installation.

Fig. 2 is a sectional side view taken on line II—II.

Fig. 3 is a sectional side view taken on line III—III.

In the diagram of Fig. 1, reference number 1 designates a trolley, 2 is the line and T is the earth (rail). A resistance 3 is connected to the trolley 1 and to earth and has branches or taps 4, 5, 6, 7, 8, 9, 10, 11, to the number of 8 in the figure, but the number of which is variable according to requirements. 12 designates a controller which by its rotation about the axis A—A by means of the crank 13, brings the wire 14 (general control wire) successively in connection with the points 4, 5, . . . 11 of resistance 3. At 16 a safety device opens the circuit of the resistance 3 when the motorman ceases to press upon the push button 15. The connection of the wire 14 with the various points 4 to 11 is established by the series of contacts 17 to 24 of the controller 12.

For each position of the controller 12, a single contact from 17 to 24 will come in contact with the corresponding contact of the series 4–11, so that for each position of the controller 12, the control wire 14 will be placed under a distinctly determined voltage corresponding to the difference of potential between each of the points 4 to 11 and earth.

The wire 14 runs all along the train. In each locomotive (or motor coach) is established the following circuit: junction 25, wire 26, contact 28, reactance 27, wire 29, winding 30, wire 31, contacts 32. The contact 32 rubs on a ring 33 integral with a contact brush 33ª which can come in engagement with a series of fixed contacts 34 to 41 separated by insulating keys 42 to 49 as shown in Fig. 3, the ring 33 being integral with a rotary controller 50. The contacts 34 to 41 are connected to different resistances 51 to 58. On the other hand, a condenser 59 is mounted between 31 and earth for absorbing the sparks at break at the rubbing contacts.

The switch 131 having an electromagnet 30, the function of which is described later on, becomes operated when the winding of the electromagnet 30 is traversed by a given minimum current; it may also be operated by a higher current, but can not be operated by a smaller current.

The electromagnet 30 actuates a cock 60 which allows the compressed air contained in a tank 61 to enter into the cylinder 62 wherein moves a piston 63, which causes the upward displacement of this piston 63. The rod 64 of the piston 63 carries a joint 65 (through the medium of the connecting rod 66 and of the crank 67, the said crank having a sufficient weight to constitute an eccentric fly wheel, that is to say a fly wheel the center of gravity of which is not located on the geometrical axis of rotation). The movement of the piston 63 is transmitted to the shaft 68. The shaft 68 is rigid with the gear 69, which drives the gear 70 by means of gearing. The axis of 70 is B—B. The gears 69 and 70 are such that when 69 effects a full revolution, 70 will rotate only a fraction of the circumference, i. e.

$$\frac{1}{n+1}$$

(in which $n$ is the number of branches or taps on 3) and in the case herein described considered 1/9. In Fig. 1, eight positions of the controller in the circuit of the motors are employed to obtain complete starting. Eight taps have therefore been made on resistance 3 and in this case the ratio of the gears 69 and 70 will be 1/9, that is to say, for a full revolution of 69 about C—C, 70 will rotate about B—B to the extent of 1/9 of a circumference.

The cock 60 is provided with conical contact surfaces for automatically taking up the play. A spring holds the cock in position for closing the inlet pipe 71 and opening the exhaust pipe 72, so that when 30 is insufficiently energized, the cock 60 will remain in position for closing the inlet pipe and opening the exhaust pipe. Thus, if the cock does not admit a sufficient quantity of air for causing the center of gravity of a crank or fly wheel 67 on the shaft 68 to come above the axis of suspension C—C, the fly wheel will come back without difficulty to its starting position. This occurs when the electromagnet 73, the function of which is described below, will open the circuit 25 to 34. The controller 50 is rigid with 70 and has the same axis B—B. The function of this controller is to obtain the required connections in the motor circuit for speeding.

Referring to Fig. 1, it will be seen that the cock 60 admits compressed air into the cylinder 62 when 30 is energized, at the same time as it closes the air exhaust pipe 72. The air driven back in the space 93 escapes at 94, when the piston head ascends. When the latter moves down again, the air contained in the space 95 escapes through 72. When 30 is no longer energized, the admission of the air is closed and the exhaust opened. Cocks 98 and 99 allow the adjustment of the speed of movement of the piston head 64 and, consequently, the speed of rotation of the controller 50. The electromagnet 30 is energized as long as the contact brush 33ª is in engagement with one of the contacts 34—41. However in order that the electromagnet 30 shall actuate the cock 60, it is necessary that a minimum voltage should exist between its terminals, as previously stated, or in other words, it is necessary that a minimum current should pass through its winding. Consequently, for a given resistance 51—58 in the circuit, it is necessary that the general control wire 14 should be under a minimum, or greater potential in order to operate the cock 60. Moreover, the duration of the action of 30 will depend on the length of the segments which constitute the contacts 34—41 and 42—49. The length of these segments can therefore be determined so as to have a sufficient admission of air for bringing the fly wheel 70 in the position of unstable equilibrium, when it will, (because of its inertia) pass the critical position and will complete its rotation about C—C because of its weight and the action of the spring 93ª. The speed of this rotation will be adjusted by adjusting the cocks 98 and 99.

On the other hand, the electromagnet 30 actuates a contact 131 which controls the circuit of an electromagnet 130. Referring to Fig. 2, the electromagnet is rigid with a plate 132 rigidly mounted on the shaft B—B. The feeding of this electromagnet takes place through the two rings 133—134 on which rub the contacts 135—136, one of which, 135, is connected to earth, and the other, 136, to the wire 137 connected by 131 to the wire 29. The electromagnet 130 attracts its armature 138 which normally forms a key between the plate 132 and the plate 133, rigid with the controller 50, loose on the shaft B—B. The energization of 130 does away therefore with this keying, and its deenergization reestablishes it, as explained hereinafter, by the action of the spring 139 bearing against an abutment 140 of the plate 132.

The operation of the device will be as follows:

If it is desired to start by hand, that is to say, if the motorman desires to graduate the speed of the train, he will bring the controller 12 into the first position which is shown in Figure 1, thus putting the general control wire 14 at the voltage between 4 and earth, viz, at $V_1$ volts, the selector being in the position of rest.

The resistance 51 will be chosen so that $V_1$ is the minimum necessary voltage for causing the cock 60 to operate. Besides, 131 is attracted so that the electromagnet 130 is deenergized and that the controller 50 is rigid with the shaft B—B. The shaft 68 will therefore rotate to the extent of a full revolution that is to say the controller 50 will rotate one ninth of a revolution. This brings the contact brush 33ᵃ opposite the resistance 51 and inserts it in the circuit 25-earth. The current is interrupted in 30 during a portion of the complete rotation of 68. The electromagnet 130 is therefore energized, but it cannot attract its armature 138. The latter is in the keyed position and the plates 132 and 133 are rigidly connected together and the friction thus effected prevents unkeying, which can only take place when at rest. The circuit of 30 is reestablished when 52 is inserted in the circuit 25-34. If the resistance 52 has been chosen so that the voltage $V_1$ is distinctly insufficient for causing 60 to operate, the controller will remain in its second position. However, in this position of rest, the energization of 30, which is insufficient for actuating the cock 60, brought back by a spring, is nevertheless sufficient for opening 131, so that the electromagnet 130 is not energized.

If the controller 12 is now brought in the second position, the general control wire 14 will be put under tension at the potential between 5 and earth, viz. $V_2$. If the resistance 52 has been suitably chosen, the cock 60 will operate again, causing the shaft 68 to effect a complete revolution, and causing the controller 50 to effect an elementary rotation and so on. By successively bringing the controller opposite the notches $a$, $b$, $c$, $d$, $e$, $f$, $g$ and $h$, the controller will be brought to positions in which the contacts 4 to 11 are successively connected to the control wire 14.

If now it is desired to start automatically, the controller 12 will be brought opposite the notch corresponding to the required connection. If, for instance, this connection is obtained by the position 6 of the controller 50, the controller must effect five elementary rotations. The controller will be moved opposite notch No. 8 and this will put the general control wire 14 at the potential between 8 and earth. The controller 50 being in the position of rest (first position) the current passing through the electromagnet 30 will be sufficient for energizing this electromagnet. The controller will effect an elementary rotation, and this will bring it to the position No. 2. The current passing through the electromagnet 30 will then be sufficient for energizing the electromagnet owing to the manner in which the resistance 52 has been chosen, as previously seen. The controller 50 will again effect an elementary rotation and so on until it arrives to the position No. 6. At this moment the current which will pass through 30 will be too weak for energizing the electromagnet 30, and the controller 50 will therefore remain in this position.

The speed of operation will obviously depend on the volume of air admitted for lifting the piston. This volume of air will be a function of the duration of admission of the air, that is to say, of the length of the segments 34—41, and of their position. This speed of operation will also be a function of the speed of exhaust of the air (which is compressed by the piston during each of the upward and downward movements of the latter) via the cocks 98 and 99. The speed of operation can therefore be adjusted by determining the length and the position of the segments 34—41 as well as the tension of the spring 93ᵃ, the adjustment being subsequently rendered more precise by adjusting the cocks 98, 99 and 100. By a suitable adjustment, the rotation of the controller 50 will be effected with a certain slowing down at the end of each of the elementary rotations. A slight period of rest will take place once this elementary rotation is effected, before re-starting for another elementary rotation. In this manner, each combination in the circuit of the motors will be effected by the controller in a very positive manner.

If the controller 12 is now brought back from the position 6 to the position 3, for instance, the voltage of the control wire 14 diminishes and the energization of 30 becomes insufficient for maintaining the contact 131 open. The electromagnet 130 is energized, and the keying between 132 and 133 is suppressed. At this moment, a spiral spring 88 connected to the controller 50 brings the latter rearward until the contact brush 33ᵃ puts the resistance 53 (position 3) in circuit. This resistance corresponds to the voltage determined by the location of 12, so that the electromagnet 30 partially energizes and opens at the circuit of 130 at 131 which, being no longer energized, permits the keying 138 and to render the controller 50 rigid with the shaft B—B.

In order to prevent the passing of too high a current through the motors, the circuit 25-earth (Fig. 1) comprises a contact 28 (or several contacts in series) closed by the electromagnet 73 the winding of which is inserted in the circuit to be protected. If at the end of an elementary rotation of the controller 50, an overload takes place in the driving circuit, the contact 28 is lifted, the circuit 25-earth is opened at 28. The electromagnet 30 being no longer energized, the cock 60 no longer operates, and the controller 50 comes to rest. As soon as the current in the driving circuit comes back to normal, the contact 28 closes, 30 and 60 act and the controller 50 again effects an elementary rotation. The function of the electromagnet 73 is to moderate the action of the controller, but the usual protecting relays in the driving circuit may nevertheless be used.

The drive for reverse running is obtained in the following manner, with reference to Fig. 1.

In each locomotive or motor coach, the current feeding the motors passes through a reversing switch operated by hand, then in an electro-pneumatic reversing device 101 operated at a distance from the head cab. Upon formation of the train, the hand operated reversing switch will be brought to the position for forward running in each locomotive or motor coach. The reversing device 101 when operated is adapted to reverse the connections made by the hand operated reversing switch. In order not to interfere with the general control previously described, which operates with direct current, the valve 102 of the reversing device 101 will be actuated by energizing its electromagnet 103 with high frequency alternating current. For that purpose, a small motor-generator set 104—105 branched on the line 106 of the auxiliary apparatus (fans, compressors) through a switch 107 is mounted in each cab. The generator is connected, on the one hand, to earth and, on the other hand, to the general control wire 14 through a circuit comprising a condenser 108 and a switch 109. The alternating current will pass through 108, will put 14 and, consequently, the circuit of the electromagnet 103, under no potential by passing through the condenser 110. The reactance 27 will prevent the alternating current from circulating in the circuit 25—33ª and the condensers 108 and 110 will prevent the direct current from circulating in the circuit of 103 and of 105.

The motorman having brought the reversing switches 100 of each locomotive or motor coach to the position corresponding to forward running, if the switch 107 is open, only forward running can take place. If he desires to run backward, he will close 107, thus starting the motor generator set 104—105. The valve 102 is mechanically constituted in the same way as the valve 60. The switch 109 allows of isolating the generator 105 from 14.

The reversing device 101 comprises at 111 a reversing drum. When the electromagnet 103 is not energized, the reversing drum is held in its normal position by an antagonistic spring. The driving device is arranged on one of the bases 111 of the cylinder or on both, but in this case with, preferably, a single control valve 102. When the electromagnet 103 of the valve 102 is energized, 102 admits compressed air from the tank 61 into the conduit pipe 118. This rotates the reversing drum 111 connecting 114 through 112 to 117 and 115 to 116 through 118. Consequently, the connections of the reversing switch 100 are reversed, resulting in backward running being obtained. When the electromagnet 103 of the valve 102 is no longer energized, 102 allows air to escape through 121 and the reversing drum comes back to its position of rest and reestablishes the connections, so that forward running is obtained. A switch 122 allows the cabs not used to be disconnected from the general control wire 14.

What I claim as my invention and desire to secure by Letters Patent is:—

1. In a control system for electric motors, a control switch arranged in a single controlling circuit for producing therein, when the said switch is operated, variations of voltage, a relay arranged in the circuit, a compressed air motor, a valve actuated by the said relay, a secondary switch actuated by the said motor and adapted to close the said circuit on different resistances so that its position corresponds at every instance to that of the control switch, a controller, rigid with the secondary switch, a clutch system for engaging the said controller with the motor, a spring acting in antagonism with the rotation of the controller under the action of the motor, an electromagnet for actuating this clutch, a contact arranged in the circuit of the said electromagnet and controlled by the preceding relay.

2. In a control system for electric motors, a control switch arranged in a single controlling circuit for producing therein, when the said switch is operated, variations of voltage, a relay arranged in the circuit, a compressed air motor, a valve actuated by the said relay, a secondary switch actuated by the said motor and adapted to close the said circuit on different resistances so that its position corresponds at every instant to that of the control switch, a controller, rigid with the secondary switch, a clutch system for engaging the said controller with the motor, a spring acting in antagonism with the rotation of the controller under the action of the motor, an electromagnet for actuating this clutch, a contact arranged in the circuit of the said electromagnet and controlled by the preceding relay, a device for reversing the direction of the running of the main motors, a compressed air motor for actuating this reversing device, an electromagnet controlling the operation of this motor and means for feeding it with alternating current.

In testimony whereof I have signed my name to this specification.

JEAN ALTMAYER, Surnamed
ALTMAYER-DELARUELLE.